United States Patent [19]
McCloy, Jr.

[11] Patent Number: 5,034,233
[45] Date of Patent: Jul. 23, 1991

[54] FROZEN FOOD THAW DETECTOR

[76] Inventor: John P. McCloy, Jr., 41 Porter St., Elmont, N.Y. 11003

[21] Appl. No.: 448,217

[22] Filed: Dec. 11, 1989

[51] Int. Cl.$^5$ .......................................... G01K 11/06
[52] U.S. Cl. ..................................... 426/88; 116/218
[58] Field of Search .................. 426/87, 88; 116/216, 116/217, 218, 219, 221, 207; 374/160

[56] References Cited

U.S. PATENT DOCUMENTS

| | | | |
|---|---|---|---|
| Re. 25,499 | 12/1963 | Fenity et al. | 116/217 |
| 2,261,473 | 11/1941 | Jennings . | |
| 2,788,282 | 4/1957 | Hammond | 116/218 |
| 2,852,394 | 9/1958 | Fahringer | 116/219 |
| 2,915,405 | 12/1959 | Hammond et al. | 116/218 |
| 2,966,261 | 12/1960 | Bradbury | 116/221 |
| 2,971,852 | 2/1961 | Schulein | 116/217 |
| 3,055,759 | 9/1962 | Busby et al. | 116/217 |
| 3,090,236 | 5/1963 | Nicol | 116/217 |
| 3,177,843 | 4/1965 | Geocaris . | |
| 3,214,278 | 10/1965 | Mylo | 116/221 |
| 3,220,259 | 11/1965 | Beyer | 116/217 |
| 3,233,459 | 2/1966 | Gleason et al. . | |
| 3,243,303 | 3/1966 | Johnson . | |
| 3,244,137 | 4/1966 | Garvey | 16/217 |
| 3,291,617 | 12/1966 | Barker et al. | 116/221 |
| 3,479,876 | 11/1969 | Kliewer | 116/217 |
| 3,548,992 | 12/1970 | Dawson | 116/217 |
| 3,615,719 | 10/1971 | Michel | 116/217 |
| 3,618,558 | 11/1971 | Tepfer | 116/217 |
| 3,695,903 | 10/1972 | Telkes et al. . | |
| 3,696,679 | 10/1972 | Peterson et al. | 116/217 |
| 3,702,077 | 11/1972 | Szabo | 116/217 |
| 3,786,777 | 1/1974 | Smith et al. . | |
| 3,844,718 | 10/1974 | Cohen . | |
| 3,942,467 | 3/1976 | Witonsky . | |
| 4,081,999 | 4/1978 | Leaken | 116/221 |
| 4,143,617 | 3/1979 | Youngren | 374/160 |
| 4,144,834 | 3/1979 | Donegan | 116/219 |
| 4,163,427 | 8/1979 | Cooperman . | |
| 4,280,361 | 7/1981 | Sala | 116/219 |
| 4,327,117 | 4/1982 | Lenack et al. . | |
| 4,563,973 | 1/1986 | Stull et al. | 374/160 |
| 4,664,056 | 5/1987 | Jehanno | 116/217 |

FOREIGN PATENT DOCUMENTS 2132196  1/1972  Fed. Rep. of Germany ...... 116/207

Primary Examiner—Steven Weinstein

[57] ABSTRACT

A device which will indicate whether thawing of a frozen item has occurred. The invention consists of a housing containing an internal cavity which is visible through a transparent section of the outside housing wall. A frozen plug is visible within said cavity. Said plug may consist of pure-water-ice or ice containing additives affecting color and/or freezing temperature. Said housing may also contain a tension-loaded indication apparatus which is held in a fixed position by means of the frozen plug. Should thawing take place, the frozen plug would melt, thus allowing the tension-loaded indication apparatus to vary its position. Subsequent refreezing would not return the device to its initial condition.

9 Claims, 1 Drawing Sheet

FROZEN FOOD THAW DETECTOR

FIELD OF THE INVENTION

This invention relates to a thaw indicator for frozen products such as foods or biological which will indicate whether items enclosed/attached have undergone thawing subsequent to their initial frozen condition.

BACKGROUND OF THE INVENTION

A variety of food items and biologicals are process in such a manner that they are intended to remain in a frozen condition until ready for use. Thawing, whether during transportation, storage or display, may affect the flavor, nutritional value, appearance, texture and possibly the healthful condition of food items. The viability of some biologicals can be at stake when continuous frozen conditions are not maintained. Through use of this invention, those involved in the distribution and/or final use of frozen products will have the ability to realize whether thawing has occurred.

SUMMARY OF THE INVENTION

This invention indicates whether the attached/enclosed item was continuously frozen since initial preparation. It is significantly different from other indicators since it accomplishes its intended purpose solely by the change of physical conditions within the device as opposed to designs which contain chemical reactants. This design can accomplish its intended objective without the use of ruptureable parts; inter-acting chemicals, solutions or dyes; such as those described in the following U.S. Pat. Nos.: 2,261,473; 3,177,843; 3,233,459; 3,243303; 3,695,903; 3,786,777; 3,942,467; 4,163,427; 4,327,117. This invention will not return to its initial condition if refrozen, thus providing a significant difference from present-condition indicators such as the indicator described in U.S. Pat. No. 2,261,473. There is no need for vapor communication between the indicator and the frozen item, thus providing a significant difference from indicators requiring this type of contact such as the indicator referred to in U.S. Pat. No. 3,844,718. This indicator can be designed to thaw at temperature levels other than 32° F./0° C. by utilizing additives will vary the freezing point of the frozen plug. Some additives, such as sodium chloride, common table salt, will depress the freezing point, while introducing other such as gelatin, will raise it.

DESCRIPTION OF THE PRESENTLY PREFERRED EMBODIMENTS OF THE INVENTION

Figure 1:
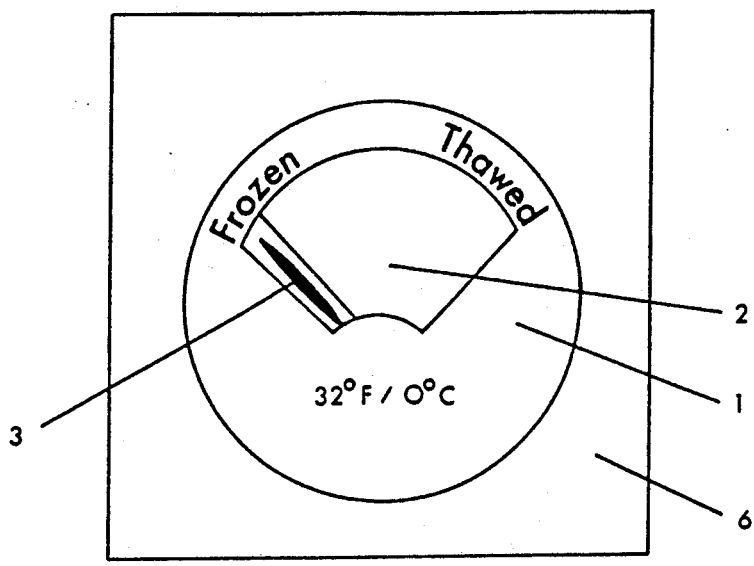
FIG. 1: Is an outside view of the presently preferred form of the invention.
Figure 3:
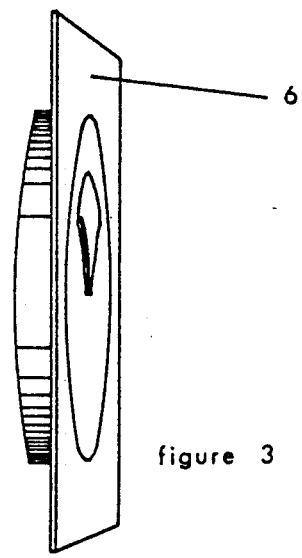
FIG. 3: Is a side-view of the presently preferred form of the invention.
Figure 2:
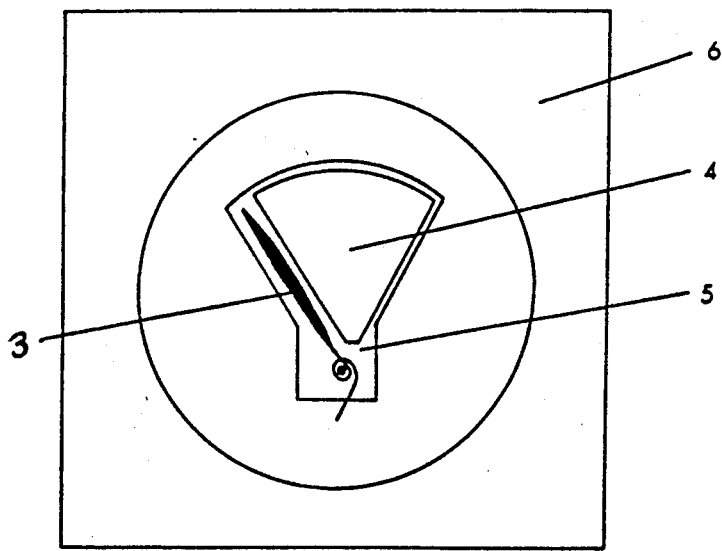
FIG. 2: Is a cross-sectional view of the presently preferred form of the invention.

The indicator, in its initial condition, will resemble the illustration represented in FIG. 1. The outside face of the indicator will have a transparent viewing area 2 through which, you can view the pointing device 3. The pointing device 3, will be tension-loaded and restrained from moving, by means of a frozen plug 4, visible in FIG. 2. When thawing takes place, the frozen plug 4 will melt, thus allowing the tension-loaded pointer 3 to alter its position from one side of the internal cavity 5 to the other side. The outside face 1 of the indicator, can identify the frozen condition on one side and the thawed condition on the other. The pointing device 3 will designate which condition is consistant to the exposure of the indicator. The outside face 1 of the indicator can also be marked in a manner to identify the temperature above which the plug 4 will begin to melt. An external flange area 6, FIG. 3, may facilitate affixing the indicator to containers such as frozen food boxes, although alternative methods to affix the indicator would in no way adversely affect performance, nor would the elimination of said flange 6. The detector as defined above can be incorporated in a wall of an individual package of frozen food or a shipping carton containing multiple units of frozen items or a container intended to transport temperature-sensitive biological materials. The detector can also be attached to individually frozen items. Although the plug can consist of purewaterice, the plug can consist of either a frozen water and salt solution in a concentrate necessary to achieve a thaw temperature lower than 32° F./0° C. or a frozen water and gelatin solution in a concentration necessary to achieve a thaw temperature greater than 32° F./0°C. Also, the plug can contain additives affecting color such that the visual characteristics of the plug change upon thawing.

What is claimed is:

1. A frozen food thaw detector comprising: a housing containing a cavity, a plug comprising a frozen liquid, and a tension-loaded pointing device; said frozen plug and said pointing device being contained in said housing; said pointing device when tension loaded being located at a first position at one side of said cavity and when said tension is released being located at a second position on the other side of said cavity; said cavity including said pointer device in both said first and second positions being viewable through a transparent outer cover on said housing; said housing containing indicia to indicate said first position and said second position as frozen food and thawed food positions, respectively; said frozen plug being positioned in said cavity between said first and second positions to restrain said tension-loaded pointing device from relieving its tension and maintaining it at said first, frozen food indicating position as long as said frozen plug remains frozen; and wherein said frozen liquid is selected such that it melts at a predetermined temperature to indicate a particular food thawing temperature such that when said particular food thawing temperature is reached, said frozen plug melts allowing said tension-loaded pointer to relieve its tension and alter its location from said first position to said second position, thus indicating a food thawed condition; said tension-loaded pointing device maintaining said second thaw indicating position even if the detector and plug is refrozen.

2. The detector as defined in claim 1 above, wherein said plug consists of pure-water-ice.

3. The detector as defined in claim 1 above, wherein said plug consists of frozen water and salt solution in a concentration necessary to achieve said predetermined thaw temperature at a temperature lower than 32° F./0° C.

4. The detector as defined in claim 1 above, wherein said plug consists of a frozen water and gelatin solution in a concentration necessary to achieve said predetermined thaw temperature at a temperature greater than 32° F./0° C.

5. The detector as defined in claim 1 above, wherein said plug comprises additives affecting color, such that visual characteristics of said plug change upon thawing.

6. An individual package of frozen food containing, in a wall thereof, said frozen food thaw detector as claimed in claim 1.

7. A shipping carton containing multiple units of frozen items and said frozen food thaw detector as claimed in claim 1 in a wall of said carton.

8. A container intended to transport temperature-sensitive biological materials and containing said frozen food thaw detector as claimed in claim 1.

9. An individually frozen item having said frozen food thaw detector as claimed in claim 1, attached thereto.

* * * * *